(12) United States Patent  
Semba et al.

(10) Patent No.: US 6,316,852 B1  
(45) Date of Patent: Nov. 13, 2001

(54) ROTATING MACHINE

(75) Inventors: Akitomi Semba, Hitachi; Tadashi Sonobe, Iwaki, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/556,175

(22) Filed: Apr. 20, 2000

(30) Foreign Application Priority Data

Apr. 28, 1999 (JP) .................................................. 11-121265

(51) Int. Cl.7 ...................................................... H02K 1/32
(52) U.S. Cl. ................................ 310/61; 310/214; 310/58
(58) Field of Search .................................. 310/214, 201, 310/61, 60 A, 58

(56) References Cited

U.S. PATENT DOCUMENTS

| | | | |
|---|---|---|---|
| 3,119,033 | * | 1/1964 | Horsley et al. ........................... 310/61 |
| 4,298,812 | * | 11/1981 | Damiron et al. ......................... 310/61 |
| 4,922,147 | * | 5/1990 | Sismour, Jr. et al. .................. 310/61 |
| 5,698,924 | * | 12/1997 | Nishida ................................. 310/214 |

FOREIGN PATENT DOCUMENTS

| | | | | |
|---|---|---|---|---|
| 5-048058 | * | 7/1993 | (JP) | .................................. H02K/1/32 |
| 9-285052 | * | 10/1997 | (JP) | .................................. H02K/1/32 |

* cited by examiner

Primary Examiner—Burton S. Mullins  
(74) Attorney, Agent, or Firm—Antonelli, Terry, Stout & Kraus, LLP

(57) ABSTRACT

An air ventilation hole provided on a creepage block and an air ventilation hole provided on a rotor winding, and having a different shape than the air ventilation hole provided on the creepage block communicate smoothly with an air ventilation hole provided on the most outer diameter turn of the rotary winding, which is in contact with the creepage block of the rotor winding. Accordingly, the withstand pressure of the creepage block can be maintained fully and also the flow of a cooling air flowing in a radial direction to the rotor winding, the creepage block, and a wedge can be formed smoothly. As a result, the cooling air can be increased and a heat exchange having a good efficiency can be carried out. Accordingly, the cooling performance of the rotor winding can be heightened and the creepage block can be formed with a high reliability against centrifugal force.

16 Claims, 4 Drawing Sheets

ROTATING MACHINE

BACKGROUND OF THE INVENTION

The present invention relates to a rotating machine; and, more particularly, the invention relates to a rotating machine having a rotor winding assembly in which a direct cooling system is employed.

In a rotating machine of the type used in electric power generation equipment in which a gas turbine and a steam turbine are adopted as a drive source, in order to reduce an increase in temperature of a rotor winding during electric power generation, a direct cooling system has been employed widely. In such a direct cooling system for a rotating machine, a cooling gas is brought into direct contact with a winding conductor which constitutes the rotor winding for cooling the winding conductor. Among the known direct cooling systems for rotating machines, Japanese application patent publication No. Hei 5-48058 discloses a radial flow cooling system for a rotating machine which has characteristics such that the structure thereof is constituted simply and heat exchange is carried out with a high efficiency.

The construction of a radial flow cooling system for a rotating machine has, in association with a slot for receiving a rotor winding, another slot, which is a sub-slot, for carrying cooling gas. The sub-slot has a different shape than that of the rotor winding slot and is formed to extend in an axial direction of the rotor. A cooling gas is supplied to the sub-slot from an end portion of the rotor, and the cooling gas first flows in an axial direction and then flows through ventilation holes in a radial direction of the rotor. The cooling gas passes through the ventilation holes which are formed in the rotor winding and goes through a ventilation hole of a creepage block serving as an insulation member and a ventilation hole of a wedge for fixing the rotor winding. The gas is then discharged to a gap which is formed between the rotor and the stator. In the course of passing through the rotor winding in this way, the rotor is cooled.

In the rotor winding, the winding conductor is laminated with plural turns stacked in the radial direction of the rotor, and by applying electricity thereto, a magnetic flux which is proportional to the number of turns of the winding conductor is generated. The winding conductor has the same cross-sectional shape for all of the turns and the abovestated various ventilation holes are provided with the same shape.

Herein, recently, much of the electric power equipment has been constructed to accommodate an increase in electric power demand; however, there is still a need to increase the generator capacity to a required level. With an increase in the generator capacity and with the same constitution as that of the conventional rotating machine, since it is required to have an even larger current and voltage, there a big problem concerning provision of ways to restrain the temperature rise in an interior portion of the generator. When the generator capacity becomes large, a direct cooling system is adopted; and, in such a direct cooling system, the heat exchange is carried out directly between the cooling gas and the rotor winding, namely, the above stated radial flow system is employed in the generator.

A generator which employs a radial flow system is constituted as shown in FIG. 5, and a temperature rise in the generator can be restrained with the use of such a system. Namely, the generator has an air ventilation passage in which a cooling gas (air) is pressurized using fans 2, which are installed at both end portions of a rotor iron core 1, and the cooling gas passes through a space between the rotor iron core 1 and a stator iron core 3 and then is returned again to the fan 2. In the course of its flow through the air ventilation passage, the cooling gas passes through a cooling means 4, which is provided in the air ventilation passage and carries out the required heat exchange to provide cooling, so that a temperature rise in the generator can be restrained.

The construction of the rotor iron core 1 of the radial flow system is shown in FIG. 6. As shown in FIG. 6, the rotor iron core 1 is constituted mainly of plural coil slots 5, which are formed near an outer peripheral face in the axial direction of the rotor iron core 1 and are disposed with a predetermined spacing in a circumferential direction of the rotor iron core 1. A rotor winding 7 is received in each of the coil slots 5, and the bottom of each coil slot 5 communicates with a sub-slot 6 which has a narrower width than the coil slot 5. The rotor iron core 1 has wedges 8 for fixing the rotor windings 7 in the coil slots 5 against the centrifugal force produced by a rotation of the generator, and creepage blocks 9 are provided for insulating between the wedges 8 and the rotor windings 7.

After a part of the cooling air 11 pressurized by the fan 2 has entered the sub-slot 6 from an end portion of the rotor, the cooling air 11 flowing into the sub-slot 6 is branched to plural air ventilation holes 10 (10a, 10b, 10c) which are spaced apart in the axial direction of the rotor winding 7. The respective branches of cooling air 11 flow in the holes 10 through the rotor winding 7 in the radial direction of the rotor and pass into an air gap which is formed between the rotor iron core 1 and the stator iron core 3 through the air ventilation hole 10c provided in the creepage block 9 and the air ventilation hole 10b provided in the wedge 8. The discharged cooling air 11 flows in the stator iron core 3 toward an outer peripheral side of the stator iron core 3 in a radial direction, and after the cooling air 11 is cooled by a cooling means 4, the cooling gas returns to the air input side of the fan 2.

When the above-stated radial flow system is intended to be used for cooling a larger capacity generator than the conventional generator, for example, as stated in Japanese application patent laid-open publication No. Hei 9-2850-52, it is important to set the shape or dimension of the air ventilation hole 10a formed in a rotor winging 7 so as to significantly reduce the air ventilation resistance of the air ventilation passage through the rotor winding 7 from the sub-slot 6, if the cooling efficiency of the generator is to be increased.

However, even when the shape of the air ventilation hole 10a provided on the rotor winding 7 is changed or the cross-sectional area of the air ventilation hole is made large, there are restrictions on such changes in the shape of the air ventilation hole 10b provided in the wedge 8 and the cross-sectional area of the air ventilation hole 10b based on the strength of the wedge 8. The wedge 8 is provided to prevent the rotor winding 7 from flying out of the coil slot 5 of the rotor in response to a strong centrifugal force, so that the wedge 8 must maintain some minimum degree of strength. Accordingly, there is a limitation on the size and shape of the hole 10b of the air ventilation passage, which in turn places a limitation on the amount of cooling air which can pass through the rotor winding 7 from the sub-slot 6.

FIG. 7 shows the shape of the wedge 8. As shown in FIG. 7, the air ventilation hole 10b formed in the wedge 8 has a round circular shape, and the interval between adjacent air ventilation holes 10b is maintained in consideration of the strength aspect of the wedge 8.

The limitation on the size and shape of the air ventilation passage in which the cooling air passes through the rotor winding 7 from the sub-slot 6 and flows into the air gap between the rotor and the stator will be discussed with reference to FIG. 8. FIG. 8 is a view showing a condition in which the rotor winding 7 is received in the coil slot 5 and showing the air ventilation hole 10*a* of the rotor winding 7 and the air ventilation hole 10*c* of the creepage block 9, as viewed from the air ventilation hole 10*b* provided in the wedge 8. As shown in FIG. 8, the shape of the air ventilation hole 10*b* provided in the wedge 8 is round, however the air ventilation hole 10*a* provided in the rotor winding 7 has an elliptical shape; accordingly, the shape (ellipse) of the air ventilation hole 10*a* differs from the shape (circular) of the air ventilation hole 10*b*.

Regarding the creepage block 9, to maintain an insulating condition between the wedge 8, which is made of a metal material, and the rotor winding 7 to which the current flows and, in addition, to provide sufficient strength to withstand the strong centrifugal force produced by the rotation of the generator, there is a restriction on the size and shape of the air ventilation hole 10*c* provided in the creepage block 9, similar to the limitation provided on the air ventilation hole 10*b* in the wedge 8. Further, to maintain the insulating condition between both metal members, the creepage block 9 must be formed to have some degree of thickness and also must be also to maintain some degree of creepage distance.

Further, in the case of a radial flow system, the air ventilation hole 10*b* provided in the rotor winding 7 is arranged to extend radially relative to the rotating shaft of the generator However, as shown in FIG. 8, the air ventilation hole 10*b* of the wedge 8 and the air ventilation hole 10*a* of the rotor winding 7 are not necessarily coincident. With the creepage block 9 being positioned between the wedge 8 and the rotor winding 7, by providing for smooth communication of air through the air ventilation holes 10*a* of the rotor winding 7 and the air ventilation hole 10*b* of the wedge 9, the air ventilation loss can be reduced.

For example, a technique is known wherein, to the rotor winding side of the creepage block 9, one axial direction air ventilation groove is formed. However, by this conventional technique of providing one axial direction air ventilation groove in the creepage block 9, the contact area between the rotor winding 7 and the creepage block 9 becomes small; and, since the pressure due to the centrifugal force of the generator acts relatively largely on the creepage block 9, it is necessary to set the groove width of the air ventilation groove of the creepage block 9 to ensure that the creepage block 9 will be crushed.

SUMMARY OF THE INVENTION

The present invention has been devised on the basis of the above stated problems, and an object of the present invention is to provide a rotating machine wherein the heat exchange in a rotor winding of a rotating machine can be improved.

Another object of the present invention is to provide a rotating machine wherein a creepage block of the rotating machine can be maintained with a strength sufficient to withstand the centrifugal force of the rotating machine.

A basic feature according to the present invention, in the rotating machine, resides in the fact that the air ventilation hole provided in the creepage block and the air ventilation hole provided in the rotor winding, which has a different shape than the shape of the air ventilation hole provided on the creepage block, communicate smoothly with an air ventilation hole provided in the most outer diameter turn of the rotor winding which contacts the creepage block of the rotor winding. Herein, the most outer diameter turn refers to the winding conductor which is arranged closest to the outer diameter surface of the rotor iron core among plural winding conductors constituting the rotary winding.

More specifically, in the rotating machine, the air ventilation holes provided in the most outer diameter turn of the rotor winding, which is in contact with the creepage block provide smooth communication in a radial direction between the ventilation holes of the wedges and the hole portions provided on other turns, other than the most outer diameter turn, so that the air ventilation holes communicate continuously in the axial direction so as to provide a smooth air passage from the sub-slots to the side of the wedges.

According to the present invention, in the rotating machine, the air ventilation holes provided on the most outer diameter turn of the rotor winding, which contact the creepage blocks, are connected continuously in the radial direction to both the air ventilation holes provided in the creepage blocks and the air ventilation holes provided on turns which are disposed immediately below of the most outer diameter turn.

Herein, continuous connection means that the air ventilation holes provided on the most outer diameter turn of the rotor winding are connected to each of the air ventilation holes provided on the creepage blocks and the air ventilation holes provided on turns which are disposed immediately below of the most outer diameter turn and have a different shape than the shape of the air ventilation holes provided on the creepage blocks.

According to the present invention, in the rotating machine, since the air ventilation holes provided on the most outer diameter turn of the rotor winding, which contact the creepage block, are provided as stated in above, the withstand pressure of the creepage block can be maintained fully, and also the cooling air flowing in the radial direction into the rotor winding, the creepage block, and the wedge can flow smoothly, so that the amount of cooling air flowing through the rotor can be increased and a heat exchange having the good efficiency can be carried out.

Herein, the increase of the cooling air flow means that, as a result of a reduction in the air ventilation loss, the cooling effect due to the cooling air is improved, thereby apparently exhibiting an increase of the cooling air flow. Accordingly, the withstand pressure of the creepage block can be maintained fully, and also an air ventilation having a good cooling efficiency can be carried out. Further, the temperature raise in the rotating machine can be reduced in comparison with that of the conventional technique.

Further, according to the present invention, in the rotating machine, the thickness of the rotor iron core in the most outer diameter turn of the rotary winding is formed thicker than the thickness of the respective other turns. The increase in the thickness of the rotor iron core in the most outer diameter turn of the rotary winding can be attained simply by increasing the thickness of one turn. Or, by overlapping two turns, one turn is formed equivalently and the current flowing into the two turns is conducted in one thicker turn of the rotor winding. Namely, insulation is not provided between the two turns, so that the two turns have the same potential. With this construction, the current density can be kept small, and the generation of heat in the most outer diameter turn can be reduced. As a result, the Joule loss can be reduced.

Further, when one turn is formed by overlapping two turns, the dimension of the air ventilation holes provided on the respective turns differ within the two turns, such that the dimension of the air ventilation hole provided in the outer turn is formed larger than the dimension of the air ventilation hole provided on the other inner turn. Accordingly, the cooling gas which has penetrated through the rotor winding from the sub-slot can flow smoothly to the creepage block and the wedge.

DESCRIPTION OF THE INVETNION

Various embodiments of a rotating machine according to the present invention will be explained with reference to the drawings. Since the overall construction of the rotating machine according to the present invention is substantially the same to the that of a conventional rotating machine, only that part of the rotating machine which represents the improvement according to the present invention will be explained.

EMBODIMENT 1

Figure 1:
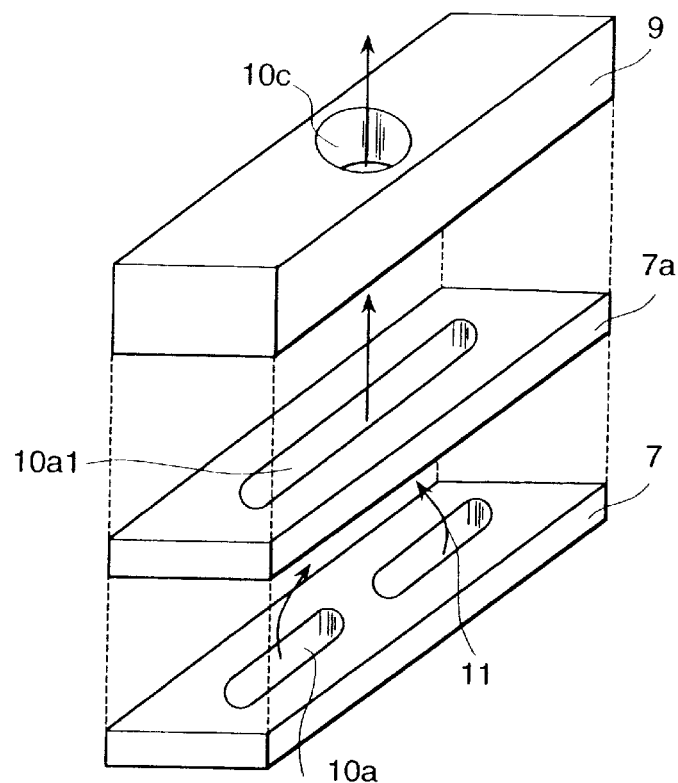
FIG. 1 is an exploded perspective view showing the arrangement and relationship of air ventilation holes which are provided respectively in the most outer diameter turn of a rotor winding and a creepage block employed in a rotating machine representing a first embodiment according to the present invention.

FIG. 1 shows a winding assembly of a rotating machine representing a first embodiment according to the present invention. FIG. 1 shows the arrangement and relationship of the air ventilation holes which are provided respectively on the most outer diameter turn and the creepage block of the rotor winding.

Figure 6:
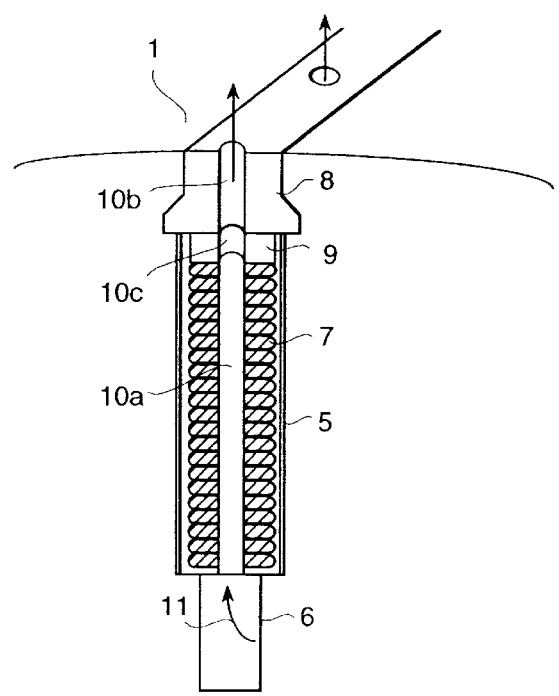
FIG. 6 is a cross-sectional perspective view showing the construction of a rotor winding of a generator in which the radial flow system is employed.
Figure 7:
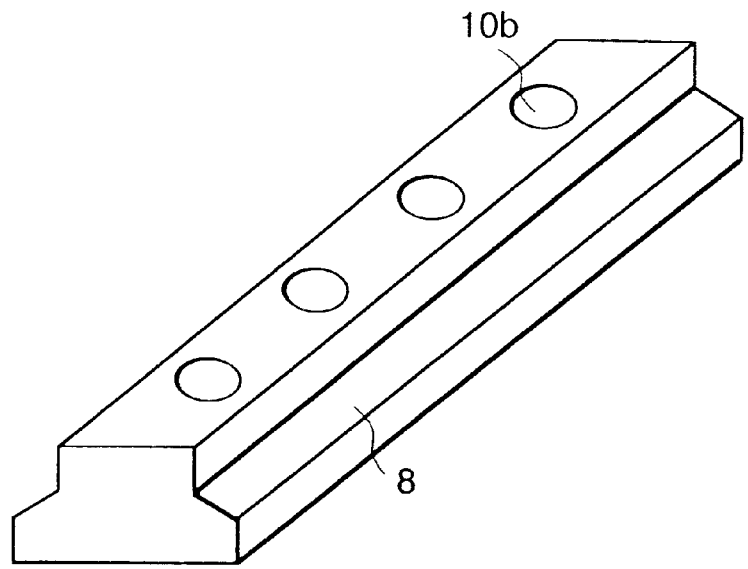
FIG. 7 is a perspective view showing the shape of a wedge used in a generator in which the radial flow system is employed.
Figure 8:
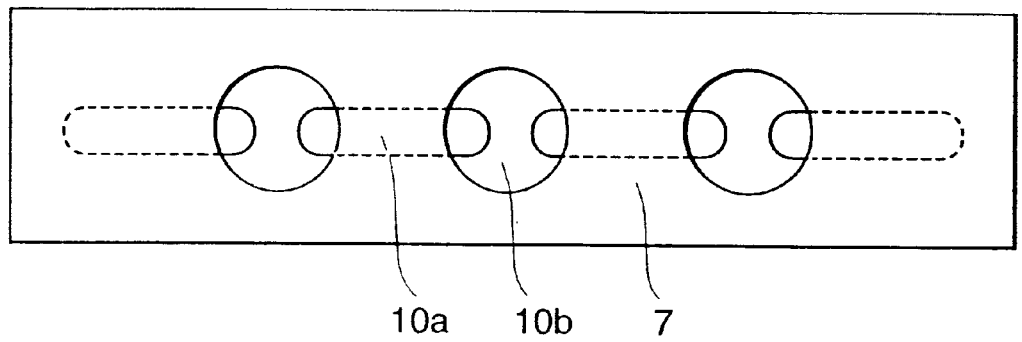
FIG. 8 is a view showing a condition in which, in a generator employing the radial flow cooling system, a rotor winding is received in a coil slot, and showing the shape of an air ventilation hole of the rotor winding and the shape of an air ventilation hole of a creepage block as viewed from the air ventilation hole of a wedge.

As shown in FIG. 1, in the rotor winding 7 of the rotating machine an air ventilation hole 10a for passing cooling air 11 received from a sub-slot 6, as shown in FIG. 6, is provided. However, the shape of the air ventilation hole 10a1 provided in the outermost rotor winding 7a differs from the shape of an air ventilation hole 10c provided in the creepage block 9 in contact therewith. In this first embodiment, the shape of the air ventilation hole 10a1 provided on the most outer diameter turn 7a of the rotor winding 7, which is in contact with the creepage block 9, is formed to have a construction for effecting good communication between the air ventilation hole 10a provided in other turns of the rotor winding 7, and the air ventilation hole 10c provided on the creepage block 9.

By providing the air ventilation hole 10a1 of the most outer diameter turn 7a with a size, shape and arrangement so as to have a low loss in communicating with both the air ventilation hole 10a provided on the other turns and the air ventilation hole 10c of the creepage block 7, the air ventilation loss of the cooling air 11 can be reduced and the cooling effect produced by the cooling air 11 can be improved.

More specifically, in the air ventilation hole 10a1 provided on the most outer diameter turn 7a of the rotor winding 7, a portion of the hole communicates in a radial direction with the sub-slot 6 via the hole portions provided in the turns, other than most outer diameter turn 7a, so that an air passage is constituted to extend continuously in the axial direction from the sub-slot 6 to communicate with the air ventilation hole lock in the wedge 8. Namely, two smaller ellipse shaped air ventilation holes, which are elongated in the axial direction, and one larger ellipse shaped air ventilation hole are radially disposed relative to each other in overlapping relationship. Accordingly, the ventilation hole 10c provided in the creepage block 9 and the air ventilation holes 10a of the turns, other than the outermost diameter turn 7a, can communicate smoothly in the radial direction of the rotor iron core 1 via the air ventilation hole 10a1 of the outermost diameter turn 7a. As a result, the air ventilation loss due to the passage of the cooling air 11 through the rotor can be reduced, and the cooling effect by the cooling air 11 can be improved.

Further, the air ventilation hole lock of the creepage block 9 is formed to have the same construction as the air ventilation hole 10b of the wedge 8; and, since the air ventilation groove used in the conventional technique is not formed in the creepage block 9, an adequate contact area between the creepage block 9 and the rotor winding 7 can be secured. As a result, in comparison with the wedge 8, which is made of a metal material, and the rotor winding 7, the creepage block 9, having a low strength, can be formed with a structure which can fully withstand the pressure generated during rotation.

EMBODIMENT 2

Figure 2:
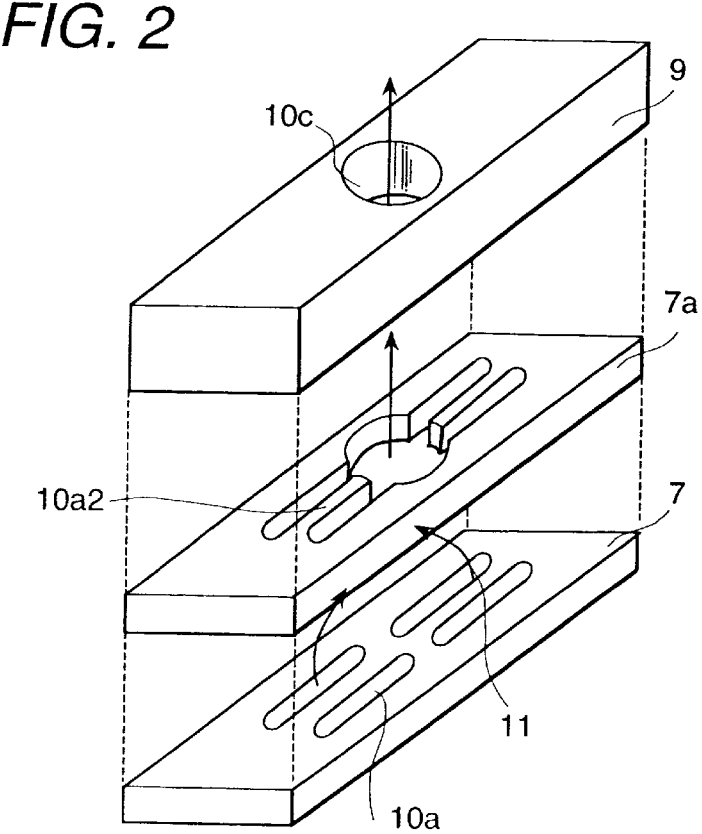
FIG. 2 is an exploded perspective view showing the arrangement and relationship of air ventilation holes which are provided respectively on the most outer diameter turn of a rotor winding and a creepage block employed in a rotating machine representing a second embodiment according to the present invention.

FIG. 2 shows winding assembly of a rotating machine representing a second embodiment according to the present invention. FIG. 2 shows the arrangement and relationship of air ventilation holes which are provided respectively on the most outer diameter turn and the creepage block employed in a rotating machine of this second embodiment.

As shown in FIG. 2, to increase the cooling efficiency of the rotor winding 7, it is necessary to increase the area occupied by an air ventilation hole 10a2 provided in the most outer diameter turn 7a and to provide smooth communication between the ventilation hole 10c provided in the creepage block 9 and the air ventilation holes 10a of the turns 7, other than the outermost diameter turn 7a, via this air ventilation holes 10a2.

To solve the above-stated problems, in this second embodiment according to the present invention, the shape of the central portion of the air ventilation hole 10a2 provided in the most outer diameter turn 7a of the rotor winding 7 and the shape of the air ventilation hole 10c provided in the creepage block 9 are the same, namely the shape of the central portion of the air ventilation hole 10a2 is in the form of a round hole. The remainder of the ventilation hole 10a2 adopts the shape of the ventilation holes 10a disposed in the other winding turns.

With the above-stated configuration, the air ventilation hole 10a2 provided in the most outer diameter turn 7a of the rotor winding 7 can be aligned with the air ventilation hole 10c of same shape in the creepage block 9, and also aligned with the air ventilation hole 10a of the rotor winding 7 which is provided on the turn immediately below of the most outer diameter turn 7a, which has a different shape than that of the air ventilation hole 10c of the creepage block 9. Accordingly, the ventilation hole lock provided in the creepage block 9 and the air ventilation holes 10a of the turns, other than the outermost diameter turn 7a, can communicate smoothly in the radial direction of the rotor iron core 1 via the ventilation hole 10a2. As a result, the air ventilation loss due to the cooling air 11 can be reduced further, and the cooling effect by the cooling air 11 can be improved further.

EMBODIMENT 3

Figure 3:
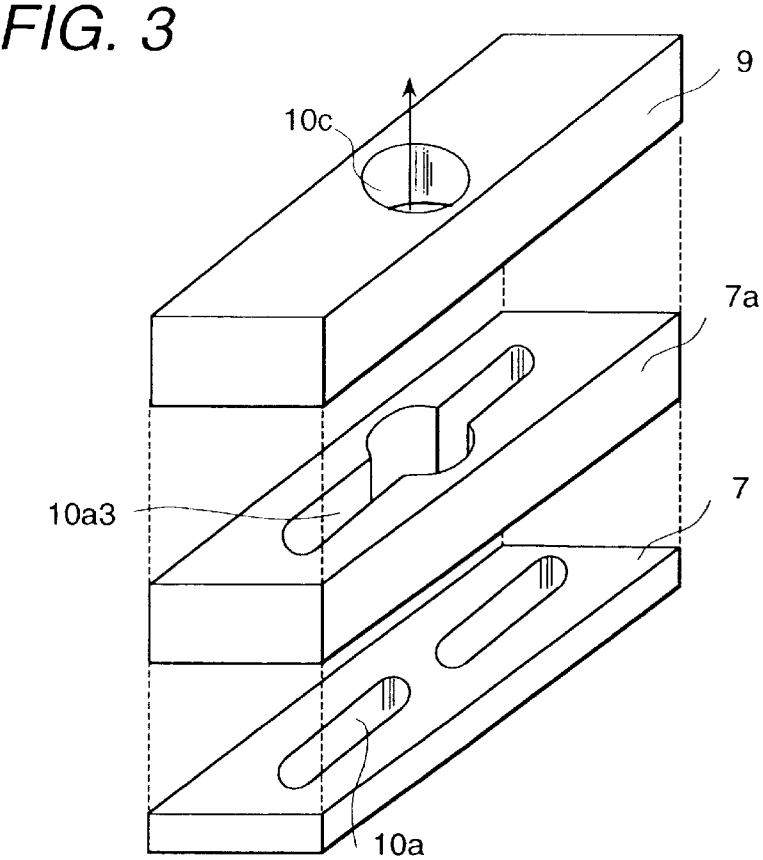
FIG. 3 is an exploded perspective view showing the arrangement and relationship of air ventilation holes which are provided respectively on the most outer diameter turn and a creepage block employed in a rotating machine representing a third embodiment according to the present invention.

FIG. 3 shows a winding assembly of a rotating machine representing a third embodiment according to the present invention. FIG. 3 shows an arrangement and relationship of the air ventilation holes which are provided respectively on the most outer diameter turn of a rotor winding and a creepage block employed in a rotating machine of the third embodiment.

In the above-stated first and second embodiments, the thickness in the radial direction of the rotor iron core 1 of the most outer diameter turn 7a of the rotor winding 7 is the same as the thickness in the radial direction of the rotor iron core 1 of the other turns. However, the dimension of the air ventilation hole 10a1 or 10a2 provided on the most outer diameter turn 7a of the rotor winding 7 is made larger than the air ventilation hole 10a of the respective other turns. Accordingly, the current density of the most outer diameter turn 7a of the rotor winding 7 will be larger than the current density of the other turns.

Taking into consideration the above-stated circumstances, in this third embodiment, the thickness in the radial direction of the rotor iron core 1 in the most outer diameter turn 7a of the rotor winding 7 is formed to be larger than the thickness in the radial direction of the rotor iron core 1 of the other turns of the rotor winding 7. Further, in this third embodiment, the most outer diameter turn 7a has an air ventilation hole 10a3, and this air ventilation hole 10a3 has oppositely disposed longitudinally extending portions which communicate with the air ventilation holes 10a of the other turns of the rotor winding 7.

Accordingly, since the electricity application area in the most outer diameter turn 7a of the rotor winding 7 has been increased, the current density can be reduced. As a result, the heat generation due to Joule heat in the most outer diameter turn 7a of the rotor winding 7 can be restrained, and the cooling effect by the cooling air 11 can be improved further. Herein, in this third embodiment according to the present invention, the air ventilation hole 10a provided on the rotor winding 7 is formed as single slots extending in the width direction, similar to embodiment 1.

EMBODIMENT 4

Figure 4:
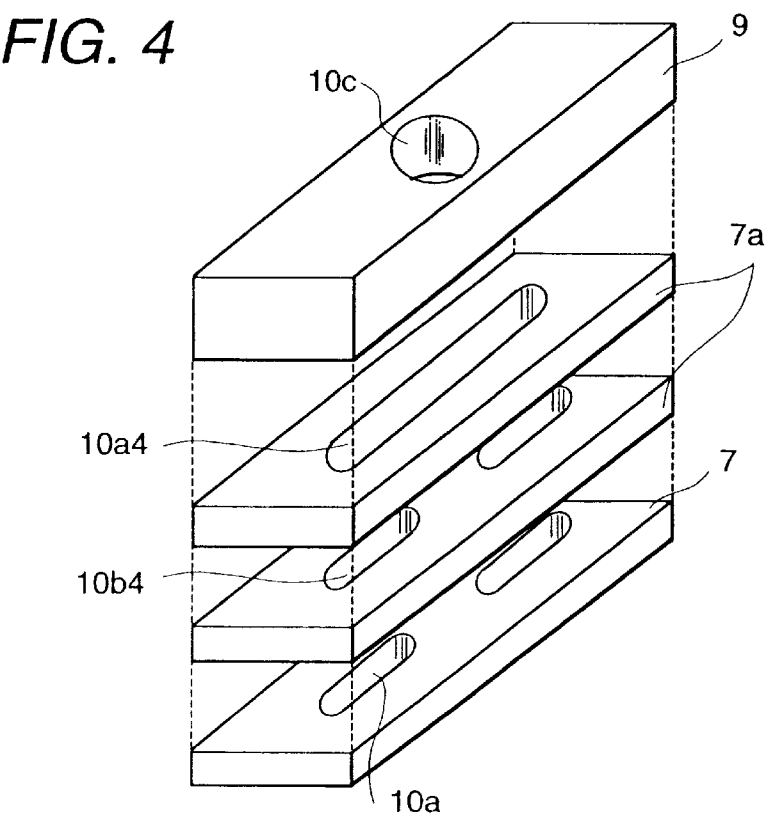
FIG. 4 is an exploded perspective view showing the arrangement and relationship of air ventilation holes which are provided respectively on the most outer diameter turn of a rotor winding and a creepage block employed in a rotating machine representing a fourth embodiment according to the present invention.
Figure 5:
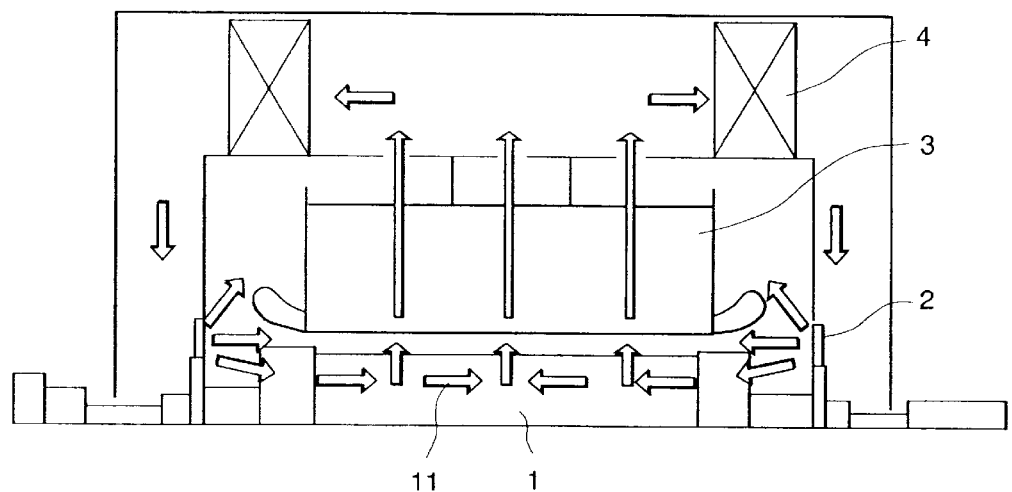
FIG. 5 is a diagrammatic view showing one example of a generator in which a radial flow cooling system is employed.

FIG. 4 shows a winding assembly of a rotating machine representing a fourth embodiment according to the present invention. FIG. 4 shows an arrangement and relationship of air ventilation holes which are provided respectively on the most outer diameter turn of a rotor winding and a creepage block employed in a rotating machine of the fourth embodiment.

As shown in FIG. 4, in this fourth embodiment according to the present invention, similar to the above-stated third embodiment, another technique is used to reduce the current density in the most outer diameter turn 7a of the rotor winding 7. In this fourth embodiment, the thickness in the radial direction of the rotor iron core 1 of the most outer diameter turn 7a of the rotor winding 7 is formed by overlapping two turns in which each turn has the same thickness. In this way, the thickness in the radial direction of the most outer diameter turn 7a of the rotor winding 7 is formed to be thicker than the thickness of the other turns of the rotor winding 7.

Between the two turns 7a there is no insulation, so that they have the same potential. The upper portion of the most outer diameter turn 7a has an air ventilation hole 10a4 and the lower portion thereof has two air ventilation holes 10b4, with the two air ventilation holes 10b4 being in communication with the air ventilation hole 10a of the rotor winding 7 and with the air ventilation hole 10a4 of the upper portion of the most outer diameter turn 7a. As a result, according to this fourth embodiment of the present invention, since the electricity application area in the most outer diameter turn 7a of the rotor winding 7 increases, the current density can be reduced. Thus, the heat generation due to Joule heat in the most outer diameter turn 7a of the rotor winding 7 can be restrained, and the cooling effect by the cooling air 11 can be improved further.

Further, according to this fourth embodiment of the present invention, within the two portions of the most outer diameter turn 7a of the rotor winding 7, the air ventilation hole 10a4 provided adjacent to the creepage block 9 is formed with the same elongated air ventilation hole 10a4 as provided on the most outer diameter turn 7a in the first embodiment. Also, the two air ventilation holes 10b4 provided on the lower portion of the turn 7a are formed with an elongated shape similar to the shape of the air ventilation holes loa of the respective other turns. Namely, the shape of the air ventilation hole 10b4 of the lower portion of the most outer diameter turn 7a of the rotor winding 7 has the same shape as the air ventilation hole 10a of the respective other turns of the rotor winding 7.

Accordingly, the air ventilation hole 10c provided in the creepage block 9 and the air ventilation holes 10a of the respective other turns, other than the air ventilation holes 10a4 and 10b4 provided on the most outer diameter turn 7a, communicate with each other smoothly in the radial direction of the rotor iron core 1 via the air ventilation holes 10a4 and 10b4. As a result, the air ventilation loss due to flow resistance of the cooling air 11 can be reduced and the cooling effect by the cooling air 11 can be improved. Further, according to this fourth embodiment of the present invention, since the thickness in the radial direction of the rotor iron core 1 of the respective upper and lower portions of the most outer diameter turn 7a of the rotor winding 7 is the same as the thickness of the other turns, so that all of the thicknesses of the turns constituting the rotor winding 7 are the same, the manufacture of the rotor winding 7 can be carried out easily.

What is claimed is:
1. In a rotating machine comprising a rotor iron core, plural coil slots provided on an outer peripheral face in an axial direction of said rotor iron core and arranged with a predetermined interval in a circumferential direction of said rotor iron core, sub-slots opened at respective bottom portions of said coil slots, rotor windings received in said coil slots, wedges for fixing said rotor winding to said rotor iron core, creepage blocks for insulating between said wedges and said rotor windings, and an air ventilation passage extending through said rotor windings, said wedges and said creepage blocks for allowing air to flow through said creepage blocks and said wedges from said sub-slots in a radial direction of said rotor iron core, the rotating machine being characterized in that:

air ventilation holes are provided in the most outer diameter turn of said rotor winding, which is in contact with said creepage blocks, respective ones of said air ventilation holes provided in the most outer diameter turn of said rotor winding being disposed so as to communicate in the radial direction with plural holes provided in at least one inside turn of said rotor winding other than the most outer diameter turn;

hole portions of said air ventilation holes are disposed so as to communicate in the radial direction with a side of said wedges and to communicate in the radial direction with hole portions of the plural holes extending in an axial direction which are provided on the inside turns other than the most outer diameter turn; and said air ventilation holes are constituted so to extend continuously in the axial direction so as to communicate in the radial direction with the side of said wedges through said creepage blocks.

2. In a rotating machine comprising a rotor iron core, plural coil slots provided on an outer peripheral face in an axial direction of said rotor iron core and arranged with a predetermined interval in a circumferential direction of said rotor iron core, sub-slots for opening at respective bottom portions of said coil slots, rotor windings received in said coil slots, wedges for fixing said rotor windings to said rotor iron core, creepage blocks for insulating between said wedges and said rotor windings, and an air ventilation passage extending through said rotor windings, said wedges and said creepage blocks for allowing air to flow through said creepage blocks and said wedges from said sub-slots in a radial direction of said rotor iron core, the rotating machine being characterized in that:

air ventilation holes are provided in the most outer diameter turn of said rotor winding, which is in contact with said creepage blocks and are disposed so as to extend continuously in a radial direction to both holes provided on said creepage blocks and air ventilation holes provided on inside turns of said rotor windings which are disposed below said most outer diameter turn, respective ones of said air ventilation holes provided in the most outer diameter turn of said rotor winding are disposed so as to communicate in the radial direction with plural holes provided in at least one inside turn of said rotor winding.

3. A rotating machine according to claim 1 or claim 2, characterized in that the thickness in a radial direction of said most outer diameter turn of said rotor winding is greater than the thickness of the respective other turns.

4. A rotating machine according to claim 1 or claim 2, characterized in that said most outer diameter turn of said rotor winding is constituted by two turns which are not insulated from each other, but have the same potential, and the dimensions of the respective air ventilation holes provided on said two turns are different.

5. In a rotating machine according to claim 1, wherein said hole portion of said air ventilation hole in the most outer diameter turn of said rotor winding has a width in the axial direction which is larger than a width of a creepage hole of said creepage block; and a wider portion of the width of said hole portion of said air ventilation hole in the most outer diameter turn of said rotor winding is narrower in the circumferential direction than said width of said creepage hole of said creepage block.

6. In a rotating machine according to claim 5, wherein in said wider portion of the width of said hole portion of said air ventilation hole in the most outer diameter turn of said rotor winding, said wider portion is narrower in the axial direction than a width of said creepage block, and said hole portion of said air ventilation hole in the most outer diameter turn of said rotor winding overlaps with said plural holes of said turns of said rotor winding other than the most outer diameter turn.

7. In a rotating machine according to claim 5, wherein a portion of at least one of said plural holes of said inside turn hole overlaps with said creepage hole of said creepage block.

8. In a rotating machine according to claim 5, wherein said plural holes provided in said at least one inside turn are provided in the circumferential direction.

9. In a rotating machine according to claim 5, wherein said hole portion of said air ventilation hole in the most outer diameter turn of said rotor winding and said creepage hole of said creepage block include a circular shape hole having a substantially same diameter.

10. In a rotating machine according to claim 1, wherein said plural holes of said at least one inside turn of said rotor winding are provided in a plurality of inside turns of said rotor winding.

11. In a rotating machine according to claim 2, wherein said hole portion of said air ventilation hole in the most outer diameter turn of said rotor winding has a width in the axial direction which is larger than a width of a creepage hole of said creepage block; and a wider portion of the width of said hole portion of said air ventilation hole in the most outer diameter turn of said rotor winding is narrower in the circumferential direction than said width of said creepage hole of said creepage block.

12. In a rotating machine according to claim 11, wherein in said wider portion of the width of said hole portion of said air ventilation hole in the most outer diameter turn of said rotor winding, said wider portion is narrower in the axial direction than a width of said creepage block, and said hole portion of said air ventilation hole in the most outer diameter turn of said rotor winding overlaps with said plural holes of said turns of said rotor winding other than the most outer diameter turn.

13. In a rotating machine according to claim 11, wherein a portion of at least one of said plural holes of said inside turn hole overlaps with said creepage hole of said creepage block.

14. In a rotating machine according to claim 11, wherein said plural holes provided in said at least one inside turn are provided in the circumferential direction.

15. In a rotating machine according to claim 11, wherein said hole portion of said air ventilation hole in the most outer diameter turn of said rotor winding and said creepage hole of said creepage block include a circular shape hole having a substantially same diameter.

16. In a rotating machine according to claim 2, wherein said plural holes of said at least one inside turn of said rotor winding are provided in a plurality of inside turns of said rotor winding.

* * * * *